US005692233A

United States Patent [19]

Garman

[11] Patent Number: 5,692,233
[45] Date of Patent: Nov. 25, 1997

[54] INTEGRATED SYSTEM AND METHOD FOR ANALYZING DERIVATIVE SECURITIES

[75] Inventor: Mark B. Garman, Orinda, Calif.

[73] Assignee: Financial Engineering Associates, Inc., Berkeley, Calif.

[21] Appl. No.: 384,376

[22] Filed: Feb. 3, 1995

Related U.S. Application Data

[63] Continuation of Ser. No. 890,437, May 28, 1992, abandoned.

[51] Int. Cl.$^6$ .................... G06F 17/60; G06G 7/52
[52] U.S. Cl. .................... 705/36; 364/578; 705/35; 345/339
[58] Field of Search .................... 364/401, 402, 364/406, 408, 419.1, 570, 578; 395/144, 145, 146, 148, 149, 155, 161, 201, 207, 210, 230, 235, 236, 326, 339, 340, 764

[56] References Cited

U.S. PATENT DOCUMENTS 5,222,030  6/1993  Dangelo et al. .................... 364/489
5,257,363  10/1993  Sapiro et al. .................... 395/500

OTHER PUBLICATIONS

OMNI (LP Model Management System); Haverly Systems Inc; Release Feb. 1977; Dialog (file 256 01015829).
Professional Dynamo Plus 3.1; Pugh–Roberts Associates Inc; Release Jun. 1987; Dialog (file 256 01245216).
OMNI, "Model Management System", Haverly Systems, Inc., 1990.

Primary Examiner—Gail O. Hayes
Assistant Examiner—Stephen R. Tkacs
Attorney, Agent, or Firm—Fenwick & West LLP

[57] ABSTRACT

A system and method for analyzing derivative securities includes a central processing unit, an input device, an output device, and a storage. The system includes input and output routines, a compiler, a sequencer, and a simulator. The input and output routines generate graphical user interfaces that allow the user to construct scenarios for simulation. A scenario includes a set of events that define changes to the value of the derivative security over time. The compiler parses an input scenario and converts it to a low-level executable object. The sequencer then uses the output of the compiler and other simulation code for a financial Monte Carlo simulation to produce programs executable by the CPU. The simulator is automatically invoked and runs the executable code using the CPU. The simulator utilizes the input and output routines to display the results on the display device. Also disclosed is a method for running the financial Monte Carlo simulation that comprises the steps of: inputting and constructing a scenario, compiling the scenario into executable code objects, sequencing the code objects with the simulation code, performing the simulation, and displaying the simulation results on the output device.

15 Claims, 7 Drawing Sheets

| SCENARIO 1 UNTITLED | | | | | |
|---|---|---|---|---|---|
| | TIME | GENCALC | PAYCON | PAYOFF | ABSCON |
| 1 | BASEDATE() + MONTH() | Y:=MAX(0, XPRICE()-360); Z:=(Y>0) | Z | 2*Y | Z |
| 2 | BASEDATE() + MONTH()*3 | | TRUE() | MAX(0, XPRICE()-350) | TRUE() |
| 3 | | | | | |

FIG. 4A

| | | SCENARIO 1 UNTITLED | | | |
|---|---|---|---|---|---|
| 1 | TIME | GENCALC | PAYCON | PAYOFF | ABSCON |
| 2 | | | | | |
| 3 | | 40 | 42 | 44 | 46  48 |
| 4 | | | | | |
| 5 | | | | | |
| 6 | | | | | |
| 7 | | | | | |
| 8 | | | | | |
| 9 | | | | | |
| 10 | | | | | |
| 11 | | | | | |

FIG. 4B

| | SCENARIO 1 UNTITLED | | | | |
|---|---|---|---|---|---|
| | TIME | GENCALC | PAYCON | PAYOFF | ABSCON |
| 1 | BASEDATE() + MONTH() | Y:=MAX(0, XPRICE()-360); Z:=(Y>0) | Z | 2*Y | Z |
| 2 | BASEDATE() + MONTH()*3 | | TRUE() | MAX(0, XPRICE()-350) | TRUE() |
| 3 | | | | | |

| RESULTS - SCENARIO 2 - SEAPC.DVI | | |
|---|---|---|
| | AVERAGE VALUE | STD. DEVIATION |
| VALUE: | 0.934279 | 0.0458901 |
| DELTA: | 0.476687 | 0.0146279 |
| UNITS: | 0.476687 | 0.0146279 |
| VALUE: | 5.72025 | 0.175535 |
| GAMMA: | 0.012188 | 0.00214751 |
| THETA: | -0.179827 | 0.0514878 |
| DAILY: | 0.000492678 | 0.000141063 |
| % ANNUAL: | -0.0149856 | 0.00429065 |

NUMBER OF ITERATIONS: 1000

INTEGRATED SYSTEM AND METHOD FOR ANALYZING DERIVATIVE SECURITIES

RELATED APPLICATIONS

This is a continuation of application Ser. No. 07/890,437 filed on May 28, 1992 now abandoned.

BACKGROUND OF THE INVENTION

1. Field of the Invention

This invention relates to a system and method for the rapid assessment of the fair market value and risk characteristics of complex financial securities without the need for knowledge of computer programming, sensitivity analysis, or statistical simulation techniques.

2. Description of the Prior Art

The present invention is directed toward an improved method for assessing the fair market value and risk characteristics of complex financial securities, a category of financial instruments that continues to broaden. Complex financial securities include, in particular, "derivative products" such as options and futures. Derivative securities fluctuate in value on the basis of the price of an underlying asset such as a precious metal, an agricultural product, or a company's common stock. The fair market value and risk characteristics of derivative securities depend on the value and price volatility of the underlying asset.

Banks, brokerages, and other major financial institutions generally apply simulation techniques to assess the fair market value and risk characteristics of derivative securities. Such techniques simulate changes in the prices of the underlying assets and other economic conditions over the life of the derivative security. Simulation techniques are employed because increasingly complex derivative securities provide various contingencies on various dates. The simulation assesses these contingencies in the context of asset price changes and economic conditions to determine an estimated payout.

One preferred simulation technique is the "financial Monte Carlo" simulation. Rather than require that all probabilities for economic contingencies be specified completely, a financial Monte Carlo simulation takes advantage of market information (within stated assumptions) and determines its own probability distribution. There are a variety of financial Monte Carlo techniques well known to those skilled in the analysis of derivative securities. Because of the complexity of financial Monte Carlo simulation, it commonly is implemented in a scientific programming language such as C or FORTRAN by staff programmers familiar with the technique, rather than by the securities traders who rely on the results. This requires that the trader communicate to the programmer the terms (contingencies, methods of calculating payoffs, underlying asset(s), and background assumptions) of the derivative security for coding into the financial Monte Carlo simulation program, as well as parameters for the behavior of the underlying asset, interest rates, and so forth. The programmer then typically codes and compiles the program, and executes the simulation. Finally, the programmer presents the resulting statistics to the trader in a numerical or graphical form which summarizes the fair market value and risk characteristics of the derivative security analyzed.

Unfortunately, this process often leads to breakdowns in communication between the trader (who is attempting to convey complex financial terms) and the research staff programmer (who is required to code the simulation), which result in errors in the simulation. As a result, the iterative process of re-coding, re-compiling, re-executing, and re-reporting frustrates a trader's ability to act quickly in response to market opportunities.

Consequently, there is a need for a system and method that allows the unsophisticated programmer or trader to perform their own analysis of the derivative securities by defining, creating and running a financial Monte Carlo simulation.

SUMMARY OF THE INVENTION

The present invention overcomes the limitations of this a prior art by creating an integrated system and method for a user unsophisticated in computer programming or simulation techniques to rapidly execute financial Monte Carlo simulations on complex financial securities without use of intermediaries. The integrated system for analyzing derivative securities preferably comprises a central processing unit, an input device, an output device, mass storage and memory means. The memory means preferably includes input and output routines, compiling means, sequencing means, and simulation means. The input and output routines of the present invention produce an interactive data input means for specifying the terms of derivative securities and parameters. The compiling means and sequencing means are used to create low-level executable code objects embodying the algebraic operations specified (or implied) by these terms and determine the sequence of execution within the simulator. The simulation means calculates the desired results, and the input and output routines are utilized to display the results on the display device. These features of the invention make it useful for other purposes, including: designing new financial instruments, evaluating complex patterns of cash flow and contingencies, auditing financial valuations produced by other systems, and "benchmarking" in-house analytic models which are used for the valuation of derivative securities.

BRIEF DESCRIPTION OF THE DRAWINGS

FIGS. 4A and 4B are graphic representations of the display device showing preferred embodiments of the graphic interface for defining and starting a simulation; and FIG. 5 is a graphic representation of the display device showing a preferred embodiment of the output of the simulation.

DESCRIPTION OF THE PREFERRED EMBODIMENT

Figure 1:
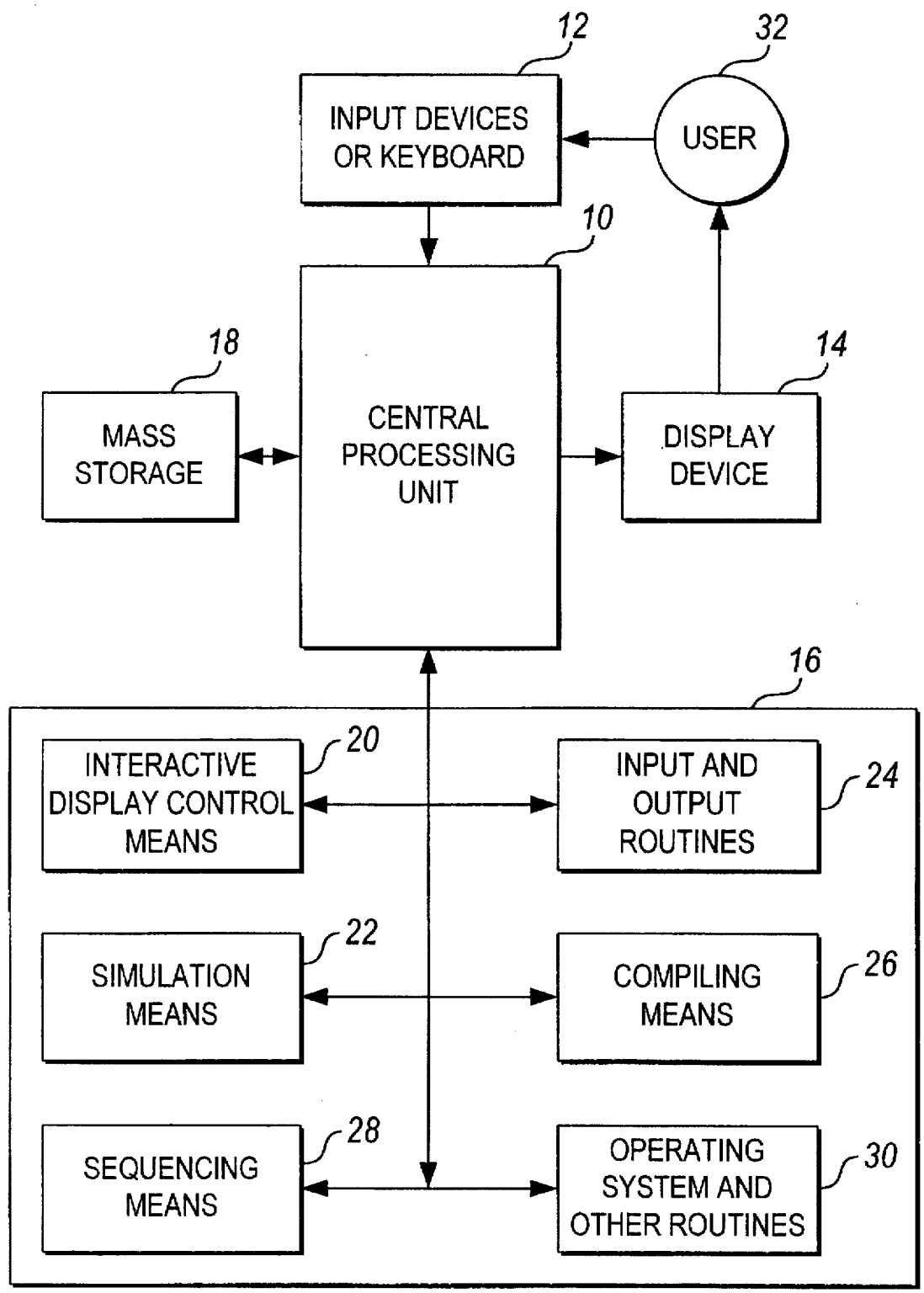
FIG. 1 is a block schematic diagram of a preferred embodiment of the system of the present invention.

Referring now to FIG. 1, a preferred embodiment of the system of the present invention is shown. The preferred system comprises a central processing unit (CPU) 10, an input device 12, a display device 14, an addressable memory means 16 and mass storage 18. The CPU 10 is coupled to and controls the display device 14 to produce a variety of images in response to inputs supplied to the CPU 10 by user manipulation of the input device 12. The CPU 10 is also coupled to other sources of information such as mass storage 18 and addressable memory 16 in a conventional architecture. In an exemplary embodiment, the CPU 10 may be a microprocessor from the 'X86 family produced by Intel™ or the 68000 family produced by Motorola™.

The input device 12 is a conventional type as known in the art. The input device 12 is preferably a keyboard with a "mouse" type controller. For example, the input device 12 may include a mouse or track ball. A pointer or mouse cursor is produced on the display device 14 to represent the position of the mouse and corresponding movement. By moving the mouse, a user 32 can point to and manipulate different objects shown on the display device 14.

The display device 14 is also a conventional type known in the art. The display device 14 is preferably a raster-type display used with the CPU 10 in a conventional manner to produce images of characters generated from codes such as ASCII in text mode. The CPU 10 may also create images on the display device 14 in other conventional ways such as producing an image from a group of dots or pixels in graphics mode as in the Windows™ operating system produced by Microsoft™. The display device 14 also operates in a conventional manner with the input device 12 to produce a cursor on the display device 14 that indicates the location where data will be input or the object on the display device 14 that will be manipulated.

The addressable memory 16 is a conventional type and preferably includes Random Access Memory (RAM) and Read Only Memory (ROM). The addressable memory 16 further comprises processing routines, programs and data for interactive display control 20. For example, the memory 16 includes input device interrupt routines and drivers. The memory 16 also includes routines for transferring data from the CPU 10 to the display device 14 and for presentation of the data on the display device 14. The memory 16 further includes an operating system and other programs 30 as conventional in the art.

More particularly, the memory means 16 of the present invention further comprises routines and means that allow the unsophisticated user to create and run financial Monte Carlo analysis. The memory 16 includes input and output routines 24, compiling means 26 and sequencing means 28, and simulation means 22. These routines and means are advantageously integrated by the present invention into system for performing financial Monte Carlo simulations on derivative securities that only requires the user input the terms for the derivative security, and its contextual market information. Thus, a user who is sophisticated in terms of financial knowledge while unsophisticated in computing or scientific knowledge is able the use the system of the present invention to run financial Monte Carlo simulations. The system of the present invention also provides improvements in performance that significantly reduce the time required to run a financial Monte Carlo simulation.

The input and output routines 24 are used along with the operating system 30 to create a unique graphical user interface (GUI) on the display device 14. The GUI is designed to prompt the user 32 to input any number of scenarios upon which a simulation is to be run. The user 32 is prompted by an interactive display control means 20 to specify the terms of the security to simulate. This specification of terms is known as the "Scenario." The input and output routines 24 produce a worksheet of five columns and several rows, and direct the placement of certain information in each column through the use of headings at the top of each column. The unique 5-part event field displayed and used by the present invention is particularly advantageous because it provides a means for the user 32 to specify all the terms of the derivative security and also improve execution speed of the system. Means are provided to make visible a portion of the available rows at any given time through the use of a scrollable window. Each row is termed an "event," since it represents information which is concurrent in simulation time, even though it is evaluated (left to right) in real time.

FIG. 4A shows the display device 14 with the GUI for inputting a Scenario producing using the input and output routines 24. The first column labeled "TIME" 40 is for inputting a date (or formula for determining a date, down to the minute on a particular date) on which the corresponding event occurs, to be evaluated by the simulation means 22. The event usually involves a possible payment to the holder of the derivative security, but may also represent any point in simulated time where calculation or simulated activities are required. The second column labeled "GENCALC" 42 is for inputting the formulae, if any, necessary to determine the values accessed by concurrent or future events. The third column labeled "PAYCON" 44 is to input any payoff contingencies, expressed as a variable evaluated as a Boolean value. The fourth column labeled "Payoff" 46 contains a formula to be evaluated by the simulation means 22 in the event that the payoff contingency is found to occur, representing the amount of the payoff of the derivative product. The fifth column labeled "ABSCON" 48 is to contain the absorption contingency (the formula for determining whether the simulation is to terminate), expressed as a variable evaluated as a Boolean value. Termination of the simulation of a derivative security is known as absorption.

Each row in the Scenario preferably comprises information relating to one "Event." An Event is a point in time at which a potentially significant scheduled occurrence takes place. Any occurrence which is known to the trader, such as the payment of a dividend on the underlying asset, or the evaluation of a contingency, and which might affect the value of the derivative security can be scheduled as an Event. Events must be listed in order of the simulated time of their occurrence.

The formulae and variables used to set forth the terms of the derivative security are expressed in a simple language capable of being transformed by the compiling/sequencing means. In the preferred embodiment, this language is known as the DerivaTool Expression Language (DEL).

FIG. 4B illustrates an example scenario for a particular derivative security with two events. The security is a call option (a right to purchase) on gold in three months at an exercise (or "strike") price of $350 (per ounce). The trader would like to know the probable return on this security, three months from now, to determine its fair market value today. Since the call option will not be exercised if the market price of gold on the exercise date is less than $350, the return might be zero. The call option will be exercised if the market price of gold exceeds $350 on the exercise date, and the return on the security will be the difference between the market and exercise prices. The estimated market price on the exercise date, "xprice( )", is determined by financial Monte Carlo simulation. The potential payoff is represented by the formula "max(0, xprice( )−350)" in the fourth column 46 of the row labeled Event 2. In columns three 44 and five 48 of FIG. 4B, the contingencies are forced to true because the payoff is certain and there are no subsequent events to be evaluated.

This security, however, has an earlier payoff contingency (Event 1) designed to protect the seller of the call option from a dramatic increase in the price of gold. If the market price of gold has risen by more than ten dollars ($10) in the first month after purchase, the seller will pay the holder of the call option twice the increase in market price greater than ten dollars ($10). In other words, if xprice( ) is greater than $360, the payoff is twice the difference, and the seller's obligations are extinguished. However, if xprice( ) is less than or equal to $360, there is no payoff and the security behaves as an ordinary call option. The formula for the relevant difference in price is the familiar one "max(0, xprice( )−360)". To simplify the Scenario, a variable can be assigned this value. In FIG. 4B, the equation "y:=max(0, xprice( )−360)" has been placed in the second column 42. If y is zero, there is no payoff; if y exceeds zero, the contingency is satisfied and a payoff must be calculated. In FIG. 4B, this relationship is represented by the Boolean operator z being assigned the value "(y>0)" in column two, and by placing z in the payoff contingency column 44 and the termination contingency column 48. The payoff formula is simply twice the price difference, or "2 * y", and is placed in the fourth column 46 of FIG. 4B.

The Scenario also includes background information on the underlying asset and the market. The user 32 is presented with means (a menu bar from which to pull down menus and representations of buttons on the display screen that can be pressed by clicking the left mouse button when the mouse cursor is positioned over the displayed button) to input this information, as well as control information for the simulation, such as the number of iterations of price calculations the financial Monte Carlo engine should perform. The user is prompted for historical asset price information through a two-column representation of a worksheet in which the user can place dates and corresponding prices. The most recent date entered is significant because it becomes the "base date" substituted in DEL expressions using the constant "basedate( )".

The user 32 is prompted for market data, including projected interest rates, the yield term structure or forward price term structure of the underlying asset, and the volatility of the underlying asset, as derived by the user from available financial information. The user 32 also has the option to "perturb" the foregoing rates, that is, to have random fluctuations introduced during the simulation process, according to user-defined parameters.

The compiling means 26 is used to parse the data input by user 32 using the input and output routines 24. The compiling means 26 extracts any algebraic codes input and converts the codes by them compiling into low-level executable objects. In the preferred embodiment, DEL expressions are parsed and reduced to tokenized form. Each token provides (a) context for further parsing, and/or (b) is connected to low-level machine language subroutines which perform computation and variable assignment. In particular, each DEL intrinsic function is associated with a token which involves such a low-level subroutine, enhancing the speed of subsequent execution of the simulation means 22.

The sequencing means 28 uses the signals output by the compiling means 26 to produce executable programs that can be run by the CPU 10. In particular, the sequencing means 28 integrates the code for performing the financial Monte Carlo simulation along with the specific parameters output by the compiling means 26 into an executable program for each event. The sequencing means 28 also arranges the data input by events for financial Monte Carlo simulation. For example, when several events are input by the user 32, the sequencing means 28 of the preferred embodiment assembles the tokens produced by the compiling means 26 into a sequence which is left to right over the five portions 40, 42, 44, 46 and 48, and then repeats for each event, top to bottom in the Scenario.

After the sequencing means 28 produces executable code, the simulation means 22 automatically runs the executable code using the CPU 10. The simulation means 22 also includes data files that are used during execution of the financial Monte Carlo simulation. The simulation means 22 executes the code and stores the results in memory 16 or in mass storage 18. The information can then be utilized by the input and output routines 24 to convey the results to the user 32.

Figure 2:
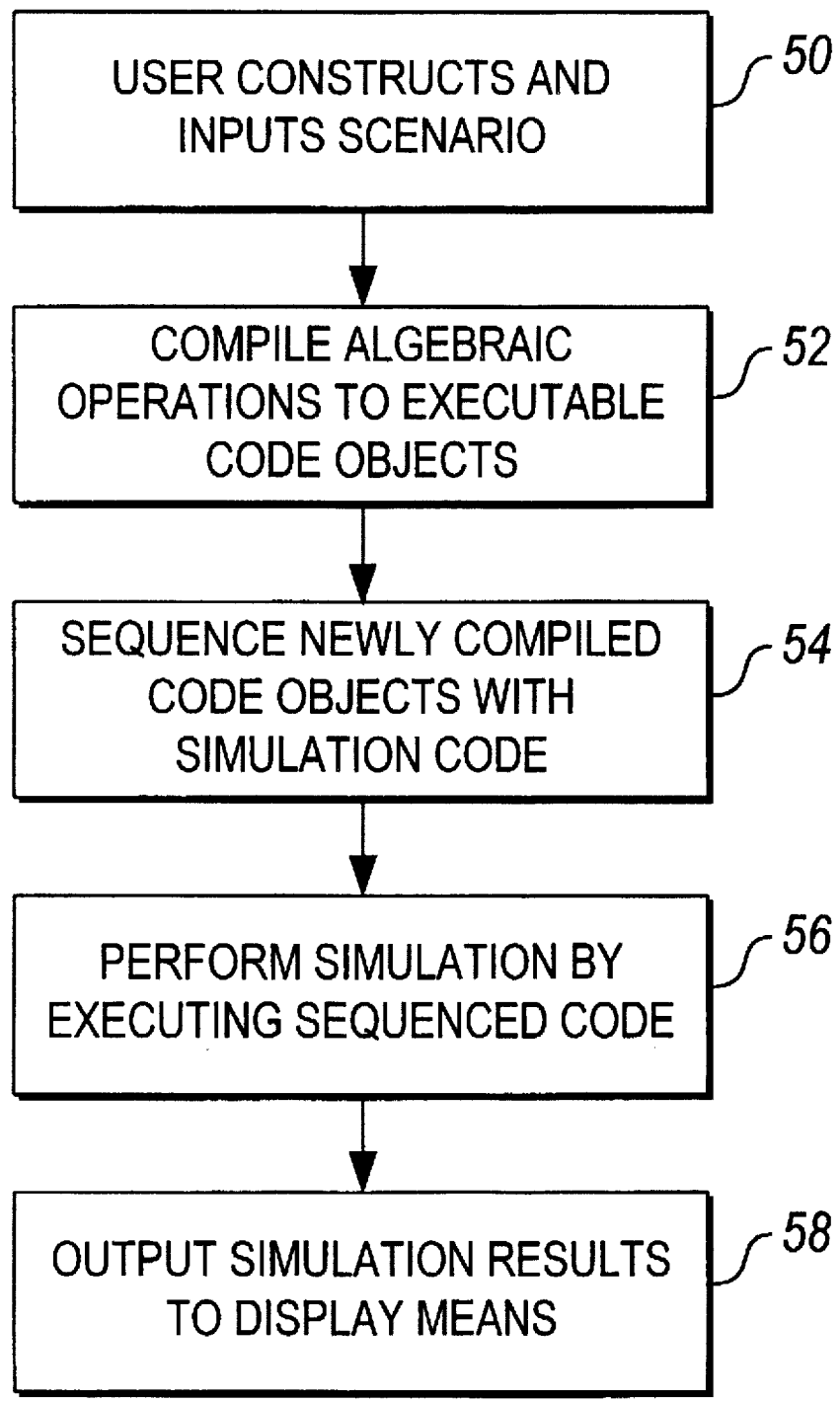
FIG. 2 is a flow chart illustrating operation of the preferred method of the present invention.

Referring now to FIG. 2, an overview of the method of the present invention is shown. The unique configuration of memory 16 provided by the present invention and the use of the operating sequences described above are directed toward an integrated method that evaluates the value of derivative securities given only the contract terms and market data. The method begins in step 50 by prompting the user for the contract terms. As has been described, the contract terms are input by specifying a Scenario with one or more events through manipulation of the input device 14. The user 32 produces five signals representing the five fields/terms that are required in each event of a Scenario describing a derivative security. Next, in step 52, the contract terms, in particular the algebraic operations in the GENCALC 42 column, are compiled into executable code objects. The code objects produced by the compiling step 52 are used along with simulation code for performing a financial Monte Carlo simulation in step 54. In step 54, the code objects are sequenced with the simulation code to produce a program that is executable by the CPU 10. In step 56, the simulation means 22 executes the sequenced code and stores the results in a predefined location in memory 16. The results are then output 58 for review by the user 32. The present invention is particularly advantageous because it allows traders to evaluate the value of securities with nominal turn around time, and with a high level of accuracy. The problems of miscommunication of the prior art that introduce significant error are eliminated with the present invention that allows the trader to run a financial Monte Carlo simulation simply by specifying the terms of the contract and market context.

Figure 3A:
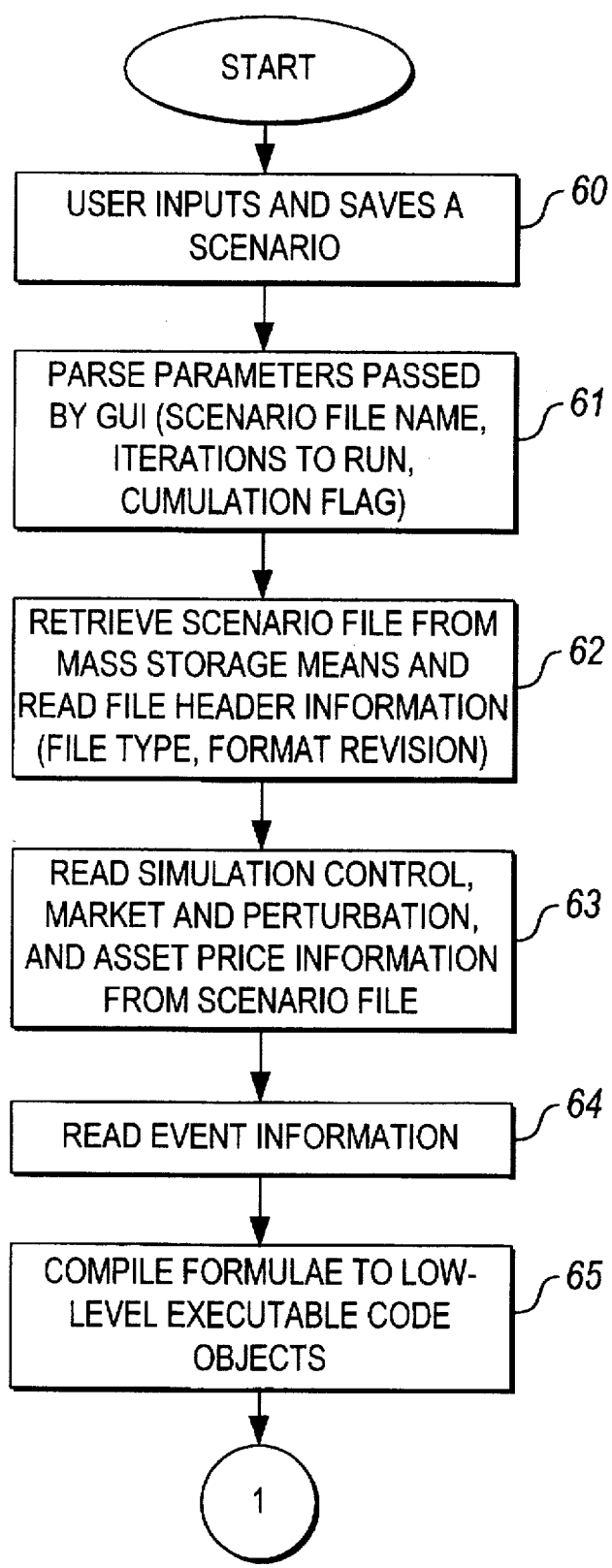
FIGS. 3A, 3B, and 3C are a detailed flow chart illustrating the operation of the preferred method of the present invention.
Figure 3B:
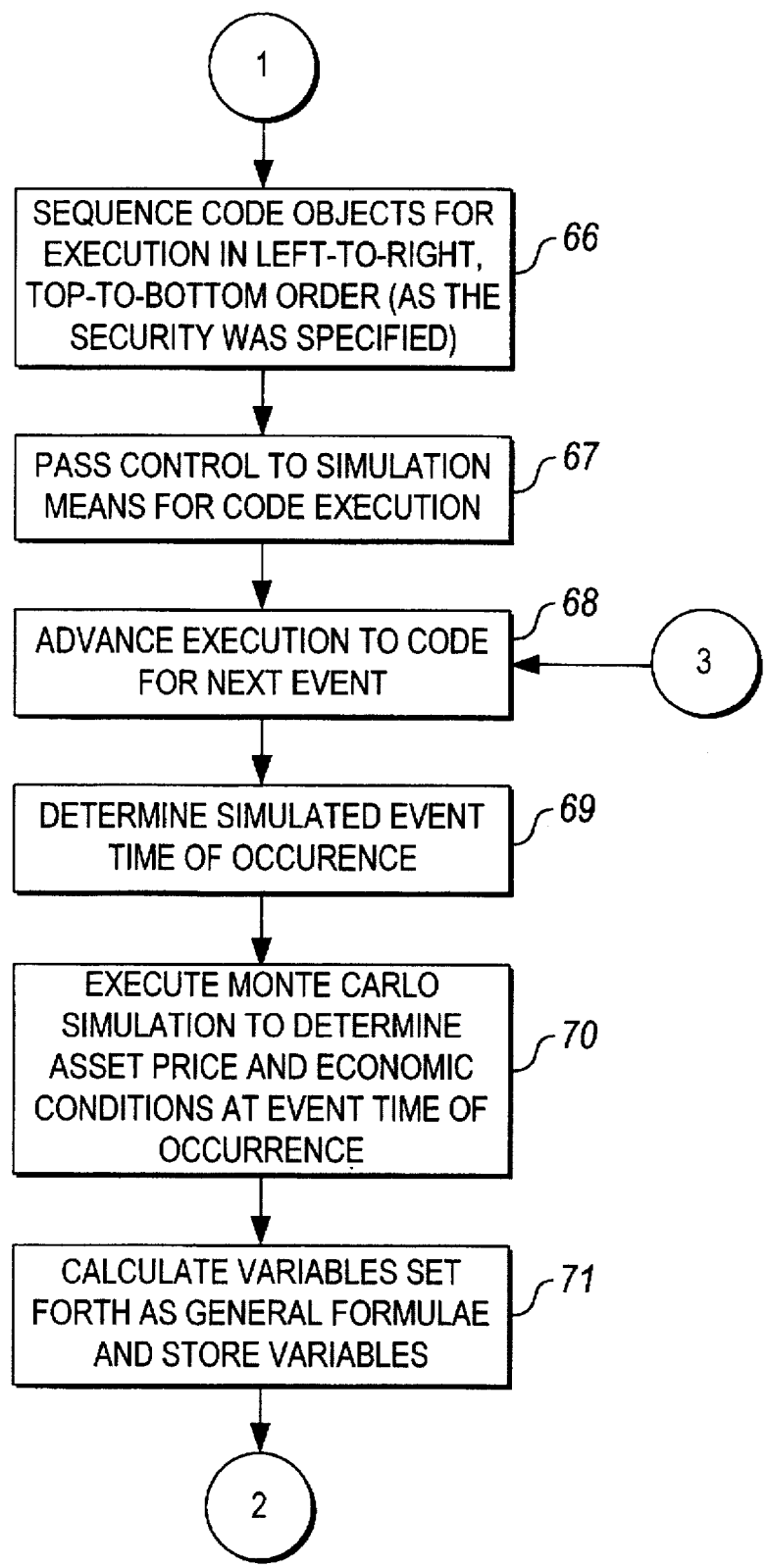
Figure 3C:
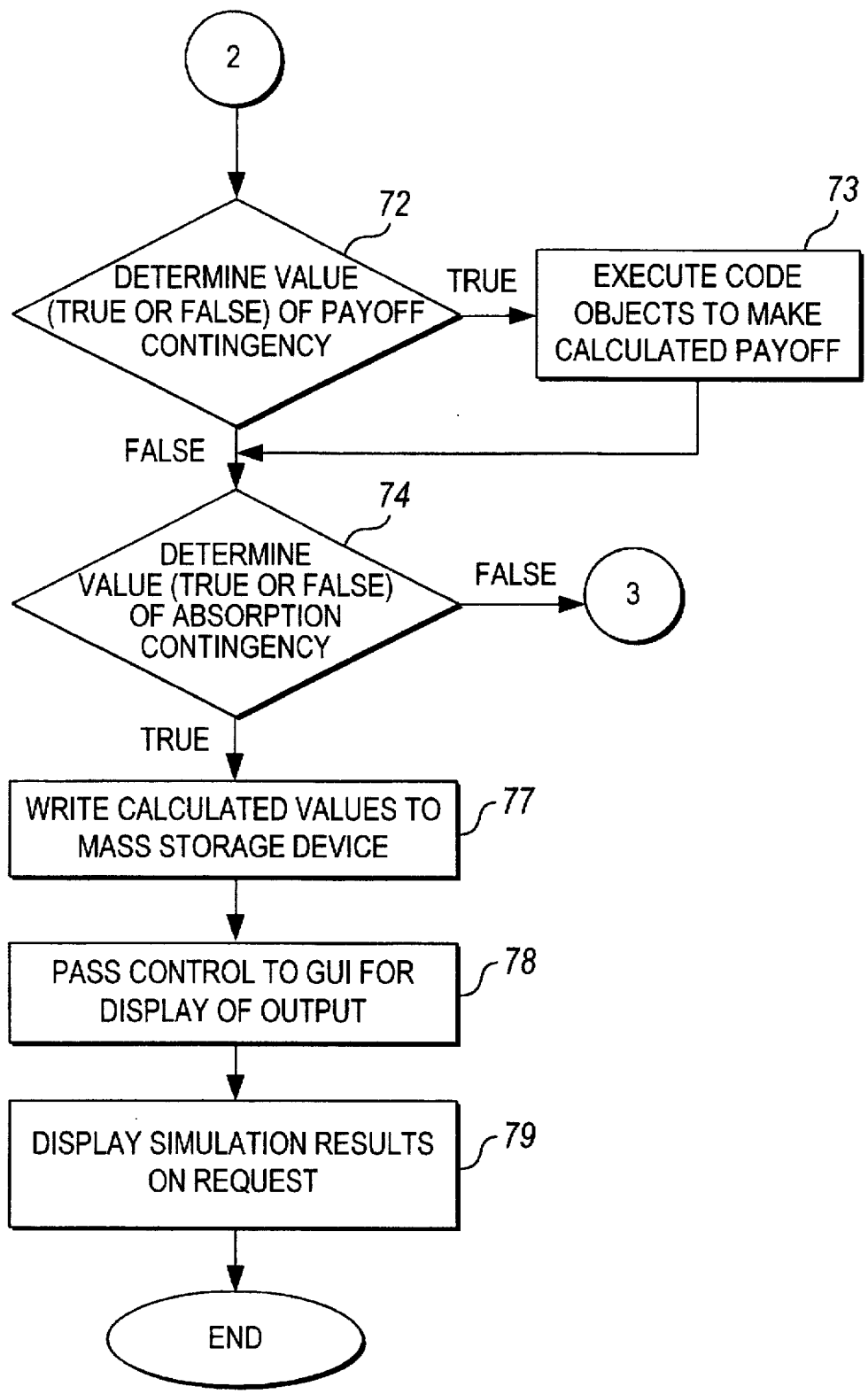

Referring now to FIGS. 3A–3C, a detailed description of the preferred embodiment of the method of the present invention for performing financial Monte Carlo analysis is shown. The method begins in step 60 by monitoring the use of the input device 12 for construction of a Scenario. After the user 32 has built the Scenario, the user 32 issues commands to store the information in mass storage 18.

In step 61, the compiling means 26 is actuated, either by selecting an option from a menu with the keyboard and/or mouse, or by clicking a representation of a button on the display screen. In step 61, the CPU 10 parses the parameter passed by the GUI including the name of the data file, the number of iterations to run and cumulation flags. The method continues to step 62 where the file containing the Scenario is retrieved from mass storage 18. Then, in step 63, the additional background information such as simulation control, market and perturbation and asset price information is read from the Scenario file. In step 64, the event information is read from the Scenario file. The compiling means 26 compiles all the information retrieved and read in steps 62–64 into low-level executable code objects. In particular, the variables, operators and formulae are transformed from text to low-level executable objects by an integral compiler. In the preferred embodiment, a low-level object is created for each variable, function name, algebraic operator etc. Each object preferably comprises (1) an external multi-byte symbol; (2) a unique one byte token; and (3) a machine-language subroutine. The symbol token association employs standard symbol table and lexical analysis techniques. The token subroutine association enables the subsequent employment of the simulation mean 22 to execute the associated subroutines of tokens as they are encountered.

In step 66, the low-level objects are sequenced for execution according to the order of events in the Scenario. The code objects are preferably sequenced in order from left to right and from top to bottom as specified in the GUI when the Scenario was constructed. Importantly, the five-part fields 42–48 of an event are employed to sequence the tokens which are produced by the compilation/lexical analysis step 65. Simulated time remains constant during all parts of an event, but the sequencing within the event is controlled by the order of appearance (left to right) in the fields 42–48 displayed to the user 32. The sequencing means 28 then passes program control to the simulation means in step 67.

In step 68, the simulation means 22 begins execution of the sequenced code produced by the sequencing means 28. The simulation means 22 directs the CPU 10 to advance to the code for the first or next event in step 68. For the event being executed, the method first determines the point in simulated time at which the first event takes place in step 69. In step 70, the simulation means 22 applies the financial Monte Carlo process to determine the prices of the underlying assets, and other economic conditions affecting the value of the derivative security and the event contingency at that point in simulated time. The simulation means 22 proceeds to step 71, and calculates variables set forth as general formulae in the GENCALC field and stores the values for the variables. In step 72, the simulation means 22 performs the specified calculation necessary to evaluate the payoff contingency and tests whether the contingency is satisfied. If the contingency is not satisfied, then the method proceeds directly to step 74. However, if the contingency is satisfied, the simulation means 22 proceeds to step 73, makes the calculated payoff, and then continues to step 74. In step 74, the preferred method tests whether the termination or absorption contingency is satisfied. If the absorption contingency is not satisfied, the simulation means 22 returns to step 68 to advance to the next event, and repeats the cycle until absorption occurs. When the absorption contingency is satisfied, the simulation is terminated.

Upon termination of the simulation, the simulation means 22 writes the results of the simulation to the mass storage means 18 in step 77 and passes program control to the interactive display control means 20 in step 78, the input and output routines 24 are then used to notify the user 32 that the simulation has run to completion. In step 79, the user 32 can then view the simulation results using the input and output routines 24. The input and output routines 24 include menus and representations of buttons for the user to view the results of the simulation, as a table of numbers and as a chart. An exemplary embodiment of the display device 14 showing simulation results is illustrated in FIG. 5.

It should be understood that in the preferred embodiment, the Scenario-building and results-viewing functions are separated from the calculation engine containing the compiling means 26, sequencing means 28 and the simulation means 22. By making the calculation engine a separate executable program, it can be invoked through the GUI interface, but run as a separate task, thread, or process (depending on the capabilities of the operating software), enabling the user to continue building alternative scenarios or to perform other, entirely separate, input-intensive work. This separation also makes possible the unattended execution of multiple simulations through execution of a "batch" file during off hours. Having described the present invention with reference to specific embodiments, the above description is intended to illustrate the operation of the preferred embodiments and is not meant to limit the scope of the invention. The scope of the invention is to be delimited only by the following claims. From the above discussion, many variations will be apparent to one skilled in the art that would yet be encompassed by the true spirit and scope of the present invention.

DERIVATOOL USER MANUAL

Version 0.8 (Beta test)

This documentation may not be copied, photocopied, reproduced, transferred, translated, or reduced to any electronic medium or machine-readable format except in the manner described in the standard FEA Software License Agreement.

© Copyright 1992, Financial Engineering Associates, Inc. All Rights Reserved. First Edition Printed 1992. Printed in the United States.

For further information concerning the documentation, contact:

>Financial Engineering Associates, Inc.
>2511 Channing Way, Suite 200
>Berkeley, CA 94704-2314 USA
>1-510-548-6200 (voice)
>1-510-548-0332 (fax)

DerivaTool is a trademark of Financial Engineering Associates, Inc.

NOTICE: This manual does not constitute financial advice; users should consult their own financial advisors regarding any such advice. Usage of this manual and associated software is permitted only following the receipt of an executed standard FEA Software License Agreement which limits Financial Engineering Associates, Inc.'s liability to users.

Contents

Chapter 1 About this manual ........................... 1-1
Chapter 2 About DERIVATOOL ........................ 2-1
    Terminology ........................................ 2-1
    Functional Overview ................................ 2-2
        Main Application Window ....................... 2-3
        Scenario Window .............................. 2-3
        Price History Window .......................... 2-5
        Market Window ................................ 2-5
        Market Perturbations Window ................... 2-5
        Simulation Control Window ..................... 2-6
        Results Window ............................... 2-6
Chapter 3 Designing Derivative Products ................ 3-1
    Gaining comfort .................................... 3-1
    A Call Option ...................................... 3-2
    A Knockout/Double-Up Call Option .................. 3-2
Chapter 4 Reference ................................... 4-1
    The DerivaTool Engine .............................. 4-1
        DerivaTool Engine Command Line Syntax .......... 4-1
    DerivaTool Expression Language (DEL) .............. 4-2
        Introduction .................................. 4-2
        Values ........................................ 4-4
        Constants .................................... 4-4
        Variables ..................................... 4-4
        Operators .................................... 4-5
        Functions .................................... 4-6
        Mathematical Functions ........................ 4-6
        Logical (Boolean) Functions .................... 4-6
        Statistical Functions ........................... 4-7
        Date/Time Functions .......................... 4-8

| | |
|---|---|
| Market Reference Functions | 4-9 |
| Event Reference Functions | 4-10 |
| Interest Rate and Volatility Inputs | 4-12 |
| Case Sensitivity | 4-12 |
| Decimal Numbers | 4-13 |
| Output Interpretation | 4-13 |
|    Theoretical Value | 4-13 |
|    Delta | 4-13 |
|    Gamma | 4-13 |
|    Theta | 4-14 |
| Index | I-1 |

Chapter 1 About this manual

This manual is the user documentation manual for DerivaTool, an application for the financial analysis of complex derivative products (options, futures, swaps, unusual and exotic products), both for valuation and risk measurement purposes.

Here we give a general introduction to this manual. Chapter 2 describes the software in terms of its uses. The terminology of DerivaTool is introduced in chapter basic concepts and windows which implement these concepts. Chapter 3 presents a series of tutorial examples and the interpretations of their simulation results. Chapter 4 provides a more technical reference for DerivaTool functionalities.

§ *When the sign "§" appears, it is followed by an important hint on DerivaTool usage.*

Chapter 2  About DERIVATOOL

DerivaTool is intended for users who are involved in structured finance, swaps, options, exotic derivative products, or generally have the need to analyze complex financial contracts. It provides a structured and integrated financial Monte Carlo environment, in which the user can quickly arrive at the valuation and risk measurement of almost any arbitrary "derivative" financial contract. (A "derivative" financial contract is one whose value is driven by some more fundamental "global commodity" price, interest rates, and volatility, as will be described more fully later.)

Some of the uses of DerivaTool are the following:

- To quickly and easily evaluate the fair value of new financial product offerings.
- To "benchmark" in-house analytic models which are used for the valuation of derivative product trades.
- To design new financial instruments.
- To evaluate complex patterns of cashflows and contingencies.
- To analyze the hedging and risk exposure characteristics of complex derivative financial products.
- To audit financial valuations produced by other systems.

Terminology

The keywords of the terminology of DerivaTool are shown below in boldface type. This section provides a quick overview of the product features, while introducing the terminology which is used throughout this manual.

DerivaTool is a tool for evaluating derivative securities. It uses Monte Carlo methods to capture the full realism of market movements and the details of security complexity. (This means that a potentially large number of alternative price paths are analyzed in a Monte Carlo simulation, with several statistics being gathered for each such path; these statistics are then interpreted in financial terms.) By definition, derivative securities depend upon (i.e. are derivative to) some more fundamental underlying "source of uncertainty," usually the price of some asset, termed herein the underlying asset. For example, a stock index futures option contract depends upon the value of a stock index like the S&P 100, and hence is a derivative product associated with the underlying asset, in this case the index value.

DerivaTool can describe a whole *sequence* of such events associated with a derivative security, which is termed herein a scenario. To provide the initial conditions for the scenario, it is also important to know current and historical market conditions. DerivaTool has two concepts related to this: (1) the market, which describes the *present* (and indirectly the market's assessment of the *future* the via current term structures of interest rates and volatility rates going forward in time for different time periods from now, called tenors), and (2) the price history, which represents the *present* and *past* prices of the underlying asset. Additional realism has been included by permitting the user the ability to create perturbations, which are random changes in volatility and interest rate term structures. In order to control the progress of DerivaTool execution, mechanisms are further provided for specifying the number of iterations, probability distributions, statistics to be gathered, etc, as control data. Finally, the evaluations executed by DerivaTool are stored as results.

During the lifetime of any derivative security, there are certain points in time where events occur. An event is an instant in time when something significant happens. For example, at any point in time when dividends or other payouts may be made to the derivative security (or the underlying asset), or when contractual quantities might be required to be calculated (such as averages or minimum/maximum values of prices), or when various termination contingencies might come into effect, etc., all of such would represent events.

The market, price history, perturbations, control data and results are all termed just data. A simulation is the combination of a scenario and its associated data. A simulation is said to be run when DerivaTool operates upon it to produce (or update) results.

Functional Overview

DerivaTool offers the user interaction with several windows to perform basic tasks. The main user tasks are (1) storing and retrieving simulations;

(2) editing simulations; (3) running simulations; and (4) displaying results. Here we give a summary of the functions of the various windows in respect of the various tasks.

Main Application Window

The main DerivaTool application has only "File" and "Help" on its menu bar. (DerivaTool requires that some file be specified, either new or old.) When a file is specified, either existing or new, the menu bar presents the full range of activities:

- *File* — create new or open existing simulations; save files containing simulations; printer operations; and exiting the application.
- *Edit* — cut, copy, paste, insert and delete data rows
- *Data* — examine or modify the current simulation data items: market, price history, simulation control, and results
- *Options* — enable or disenable window tools: status line, button ribbon, function pallet, edit bar, charting
- *Run* — check file syntax, run simulation, run with discarding prior results, abort simulation
- *Window* — arrange window tile features

Scenario Window

The main element associated with a simulation is the scenario, which describes the derivative product. The scenario window looks like a spreadsheet, but is in fact a highly structured description of a scenario. Each row in the scenario corresponds to an "event," or something which happens at a single point in time within the simulation. Time moves from top to bottom in the scenario window, so that the earlier the event occurs, the more towards the top of the scenario window it appears. Simulated time moves from top-to-bottom in the scenario window, but there is also a sequencing within events. While all elements in a row (i.e. event) represent the same point in *simulated* time, in fact the five basic elements of an event, described below, are sequenced from left to right. Thus the scenario reads like a (an English language) book, left to right and down the page. The five elements describing an event are:

- *Time* — the time at which the event occurs; this may be fixed in advance, or computed at simulation run time
- *General Calculations* — general programming statements produced in DEL, the DerivaTool Expression Language.
- *Payoff Contingency* — a boolean calculation to determine whether a payoff should occur.
- *Payoff Amount* — the payoff to be made at this point in simulated time.
- *Absorption Contingency* — a boolean calculation to determine whether the simulation should end.

The first element of an event is the time at which the event occurs. This time can be fixed or computed at the point where the event is reached: all that is important is that the occurrence time of the event is not earlier than that of the prior event. When the event's occurrence date is known, all market-related quantities are immediately also known and available for that event's calculations.

The second element of an event is the specification of general calculations. For example, if a statistic of some sort is required, this may be specified in a general programming language within the second column of the scenario, for each event. The general calculation capability permits access to market quantities, mathematical functions, and previously computed quantities.

The third element, being also the third column in the scenario window, is the payoff contingency. This is a boolean calculation which results in the value one ("true") or zero ("false," which also applies to computed results other than one). If the result of the payoff contingency calculation is "true," then the payoff to the derivative security is made, in a size dictated by the next event element.

The fourth element is the payoff itself. If the payoff contingency is "true," the formula for the payoff amount is evaluated in the event column of the scenario. The payoff is then "paid" to the derivative security. (It is also possible to make "payouts" to the underlying asset which are unprotected in the derivative security, but these are done in the general-calculations portion of the event.) Ultimately, payoffs are what give the derivative security current value.

The fifth and final element of an event is "absorption." This is a boolean formula, which if it evaluates to "true," means that the simulation ceases. In other words, if absorption occurs at the event, the simulation stops then.

When the simulation has executed all of the operations for a given event, it then proceeds on to the next event.

Price History Window

The price history window describes the historical prices of the underlying asset. The data elements are input as date-price pairs. All of these prices are available to calculations conducted within the scenario. The date of the most recent price is termed the basedate, and is referenced via a function named basedate().

Market Window

The market window also has a tabular form. The rows correspond to dates in the future (relative to the basedate). The first column is a date, and can be input in standard (U.S.-style) date notation. The second column is the domestic interest rate for lending/borrowing from the basedate to the date given. (This is the "term structure" of interest rates.) The third column is user-selectable to be either (a) the asset yield (rate of payout, such as a foreign currency's interest rate), or (b) a forward price (such as is normally available in commodity markets). Depending on which is selected, this would be referred to as either the yield term structure or the forward price term structure. The fourth column is the volatility of the underlying asset for the future date, collectively termed the "volatility term structure."

§ *All term structure quantities are expressed in decimal terms. Thus, an interest rate of 6% is 0.06, a volatility of 20% is 0.2.*

Market Perturbations Window

For additional realism, it is possible for DerivaTool to "perturb" the market term structures randomly, as simulated time progresses. This is an advanced feature, not recommended for early attempts or tutorial usage.

Simulation Control Window

The simulation control window contains data elements which control the simulation itself. One important control parameter is the replications, which is the number of simulation iterations to be made. Two types of price change distributions may be selected by the user, normal and lognormal. (Since normal price changes can result in negative prices, it is usually recommended that the lognormal be employed.) The simulation control window also toggles the production of various summaries of the simulation, namely whether to produce risk measures and whether to produce a histogram of outcomes.

Results Window

In general terms, the results produced by DerivaTool are:

☐ Theoretical value.
☐ Delta, or net equivalent underlying asset exposure. This is provided in three flavors: percentage delta, delta in asset units, and delta in value units.
☐ Gamma, or "convexity" of exposure.
☐ Theta, or "time decay" of exposure. Three flavors of theta are also provided, one an annualized theta, the next a daily theta, and finally an annualized theta in percentage-of-value terms.

Of these, the theoretical value is always produced. Delta and gamma are both price-related risk measures, and are toggled on and off in the simulation control window. Theta is a time-related risk measure and is toggled separately. Simulation runs which include delta, gamma and theta take longer to execute; they should therefore be turned off when the user is uninterested in these risk measures, thereby speeding the computation of the theoretical value.

Chapter 3  Designing Derivative Products

In this chapter, we provide a series of tutorial examples for using Deriva-Tool to design/describe derivative products.

Example 1  Gaining comfort

The first example is a very simple derivative product, namely the right to receive a sum of money equal to the price of a non-dividend-paying stock in one year from now. Follow these steps to analyze this derivative product:

1. Do *File New* on the main application window. A scenario window "Untitled" will open.
2. Enter "chgtime(basedate(),1,year())" in the Time field of the first event. This has the effect of specifying the event's occurrence to take place at a date one year from the basedate. (DerivaTool has an internal calendar to keep track of leap years, etc.)
3. Click on the PayCon field of the first event and enter "true()" in the field. This says that the payoff is made unconditionally.
4. Click on the Payoff field of the first event and enter "xprice()". This has the effect of making the payoff amount equal to the price of the underlying asset at the time of the event.
5. Do *Data Price-History* on the main application menu. Enter today's date (format MM/DD/YY) in the Date/Time field at the top left of the price window. Click on the Value field directly to the right, and enter "50". Close the window by clicking on "OK."
6. Do *Data Market* on the main application menu. Enter today's date (format MM/DD/YY) in the Date/Time field at the top left of the window. Click on the Numeraire field just to the right; enter "0.06". Click on the Rate field and enter "0.0". Click on the volatility field and enter "0.35". Close the window by clicking on "OK."
7. Do *Data Simulation-Control* on the main application menu. Click on the 1,000 Replications diamond. Click on the LogNormal price change distribution. Verify that the Number of Units field is "1". Close the window by clicking on "OK."

8. Do *Run Syntax-Check-Only* on the main application menu. The File Save dialogue box should come up. Name the file STOCK.DVT in the File Name field. (\*\*\* BETA NOTE: the current beta release uses .DVI files, not .DVT extensions, which it does not yet recognize. Name the file STOCK.DVI instead. \*\*\*)

9. Do *Run Simulation* on the main application menu. Click on the dialogue boxes.

10. Do *Data Results* on the main application menu. (Confirm that the theoretical value for the simulation is around 50.) The numbers in the left column show the statistics for the simulation run. The numbers in the right column show the sample standard deviations of the results.

Example 2 A Call Option

Here, we modify the STOCK simulation described above to create an ordinary call option, struck on the same underlying asset, at a price of 49..

1. Do *File Open-Scenario* on the main application menu. Double click on STOCK.DVT (\*\*\* BETA NOTE: STOCK.DVI \*\*\*) Click on the Payoff field at the top and edit it to read "max(xprice()-49,0)".

2. Do *File Save-as* on the main application menu. Click on and edit the File Name field to CALL.DVT (\*\*\* BETA NOTE: CALL.DVI \*\*\*) Close the dialogue box by clicking on "OK."

3. Do *Run with Discard* on the main application menu. (This has the effect of throwing out the old results in the STOCK simulation.)

4. View the results page by doing *Options Ribbon* and then clicking the Results button on the ribbon bar.

Example 3 A Knockout/Double-Up Call Option

Now we further modify the foregoing call option example to provide two new features: (1) if, at the end of any intervening calendar quarter, the price of the underlying asset has slipped below 42, the option is cancelled altogether; and (2) if, at the end of any calendar quarter, the price has risen above 55, the option payoff is doubled. To implement this derivative product description, we could create a scenario that looks like the following:

| Time | GenCalc | PsyCon | Payoff | AbsCon |
|---|---|---|---|---|
| chgtime(basedate(), 3, month()) | twice:=1; kill:=(xprice()<42); mult:=if(xprice()>55, 2, 1); twice:=max(twice,mult) | | | kill |
| chgtime(basedate(), 6, month()) | kill:=(xprice()<42); mult:=if(xprice()>55, 2, 1); twice:=max(twice,mult) | | | kill |
| chgtime(basedate(), 9, month()) | kill:=(xprice()<42); mult:=if(xprice()>55, 2, 1); twice:=max(twice,mult) | | | kill |
| chgtime(basedate(), 1, year()) | kill:=(xprice()<42); mult:=if(xprice()>55, 2, 1); twice:=max(twice,mult) | true() | twice* max(0, xprice()- 49) | |

Chapter 4 Reference

The DerivaTool Engine

DerivaTool is divided into two parts, the DerivaTool Engine (DE) and the DerivaTool User Interface (DUI). The DE is the simulator engine which lies at the heart of DerivaTool. It works from an ASCII file which is created by DUI.

DerivaTool Engine Command Line Syntax

The DerivaTool Engine can be used by itself from a DOS command line. If you want to use DE from a DOS prompt, these are the options: pathname Scenario file path (required), e.g. c:\DE\foo. Gets turned into c:\DE\foo.dvi, etc. -e Error log file - results in (e.g. c:\DE\foo.err. If not specified, errors go into drvtool.err. -d Use temporary results file - output section only Results in (e.g.) c:\DE\foo.dvo -x File to be created at end of execution to signal process completion. Results in (e.g.) c:\DE\foo.x -r Reset output (act as if "has output flag" is false -s long Seed value for random number generator (for debugging) -c Syntax check file (equivalent to -i 0) -i long Iteration count -q "Quiet": no output to console -p Report payoff condition result to console - debugging only!!!

Some examples of common things to do:

dtengine -c euroyear Does a syntax check on the file "euroyear.dvi" in the current directory rainier -r -i 1000 c:\check\seapc Runs a thousand iterations on the file "c:\check\seapc.dvi", putting the results in the same file. Because of the "-r" option, it throws away any previously-accumulated results before running the simulation. Using the -r option is highly recommended the first time you run a hand-edited scenario file.

rainier -i 10000 c:\check\seapc -d Runs another ten thousand iterations on "c:\check\seapc.dvi". Puts a copy of the resulting output section into "c:\check\seapc.dvo". Because the -r option is absent, any previous results will be accumulated with the new results.

FILE NAME EXTENSIONS ⎯⎯⎯⎯⎯⎯

5/5/92

The following are mandatory extensions for various files associated with DerivaTool. They are used to construct input and output file names from the pathname provided on the Rainier command line. (This is done because if you give full pathnames for every file associated with a simulation, and the pathnames are long, you quickly run over some inherent limits on the length of DOS command lines.)

EXTENSION FILE TYPE .dvi Scenario file .dvo Temporary results file - after the simulation, this has the same information as the output section of the scenario file .dvx File is created to signal when a simulation is finished. .dvk Kill file. This is a way for Grace to terminate a simulation; you can't do it with an OS-supported IPC facility, since DOS doesn't have such a thing. .err Error file. If a simulation terminates prematurely, the reason is given as a human-readable text string on the first line of this file. The remainder of the file is debugging information and is not of any fixed format.

HARDWARE LOCK ———

You must use a properly serialized and authroized hardware lock with this version of DerivaTool. Otherwise, DerivaTool will give you an error message.

DerivaTool Expression Language (DEL)

Introduction

This section is a general technical description of the DerivaTool Expression Language, "DEL," which is employed by the DerivaTool Engine in executing simulations. DEL expressions are contained (as ASCII) in the .DVT DerivaTool files.

DerivaTool resembles a spreadsheet program in some ways: it has a notion of formulas entered into cells, which are then evaluated based on row/column position. However, DerivaTool also has user-defined variables, similar to a normal programming language, and also has some unique features. As a result, CEL borrows from the expression languages used in spreadsheets, C, and Pascal.

In order to understand some of the unique features of CEL, it helps to understand its relationship to DerivaTool and its user interface. To set up a simulation, you enter numbers into Grace in several tables of background information (historical prices, market information, etc.) You also define an option by entering CEL formulas into the Event Setup window. Finally, you run the simulation; this invokes Rainier, which runs a Monte Carlo simulation by repeated cycles of generating random prices (using the background information) and using them to evaluate the Event Setup worksheet, row by row, top to bottom. (Each row is called an "event").

The Event Setup window is the only place where CEL expressions may be entered. It consists of five columns, and a user-defined number of rows. The five columns are: Time, General Calc, Payoff Condition, Payoff Value, and Absorption Condition. Expressions may be entered into any of these columns.

Each row in the Event Setup window represents an "event". An event consists of one or more actions which occur at a given date and time.

For each event, the Time cell must be filled in, and this represents the date and time at which that event occurs. This may either be a constant or a calculated value. The time for any given event must be greater than or equal to that for the previous event; otherwise, the simulation aborts with an error.

General Calculation cells allow the user to set the values of user variables. (In fact, you can't do anything else in such a cell, and it's the only place you can do it.) Assignment is done using the assignment operator ":=", which is discussed below. The cells in this column have no value, and may not bereferenced in formulas. You can put more than one assignment formula into a general calculation cell by separating them with semicolons.

Payoff Condition and Payoff cells determine whether or not a payoff occurs during a particular event, and if so, how much the payoff is. Both or neither of these cells must have a formula in an event. A Payoff Condition cell is evaluated for a boolean result. If it evaluates to TRUE, the Payoff Value cell is calculated and its value is added to the payoff for that cycle (after being discounted according to the Market Setup rates).

The Absorption Condition cell is also evaluated as a boolean, and determines whether or not the option is "absorbed", or terminated, at that event. The idea here is that you could have an option which is absorbed before the end of its potential lifespan (Note 5).

Values

DEL values may be numbers or date/time values. All values in DEL are represented internally as 64-bit floating point numbers, so numbers will be correct up to about 15 significant digits.

Constants

DEL supports two kinds of constants: numeric and date/time. It does not support text constants (or any text operations, for that matter).

Numeric constants may be in the usual integer, floating point, and mantissa-exponent (E-type) formats.

Date and time constants begin with the @ symbol and may be in any of the following formats: @month/day/year @hour:minute @month/day/year:hour:minute The month, day, etc. are integers in the appropriate ranges; out-of-range values are treated as errors. Hours are in 24-hour time. (Note 1). Year values may be given in the form 19XX, 20XX, or just XX. In the latter case, values less than 50 are assumed to be 20XX, and other values are assumed to be 19XX. The acceptable years run from 1970 to 2037.

Variables

User variable names must start with a letter, and the following characters may be any combination of letters and numbers. Variables may be used to contain numbers or date/time values. The number of variables used in a simulation and the length of variable names is constrained only by available memory.

Date/time values can be added to and subtracted from dates and other time values. The following table provides examples.

| Calculation | Effective Result |
|---|---|
| @9/19/91 + @14:00 | @9/19/91:14:00 (2 PM, Sept. 19, 1991) |
| @23:00 - @3:40 | @19:20 (7:20 PM) |
| @8/24/91 + 24 * @1:00 | @8/25/91 |

As shown in the third example, DEL permits the use of other operators and functions with date and time values. Some calculations don't make much sense, though. (For example, if you add two dates, you will get a result, but it may not mean anything useful.)

Operators

DEL provides a fairly complete set of arithmetic, comparison, and logical operators. Permitted operators are: The special operator ":=" (assignment)

| Type | Symbol | Meaning |
| --- | --- | --- |
| Unary | - | sign reversal *(arithmetic)* |
| Unary | ~ | not *(logical)* |
| Dyadic | = | equal *(comparison)* |
| Dyadic | ~= | not equal *(comparison)* |
| Dyadic | > | greater than *(comparison)* |
| Dyadic | < | less than *(comparison)* |
| Dyadic | >= | greater than or equal to *(comparison)* |
| Dyadic | <= | less than or equal to *(comparison)* |
| Dyadic | \| | or *(logical)* |
| Dyadic | & | and *(logical)* |
| Dyadic | * | multiply *(arithmetic)* |
| Dyadic | / | divide *(arithmetic)* |
| Dyadic | + | sum *(arithmetic)* |
| Dyadic | - | difference *(arithmetic)* |
| Dyadic | := | assignment *(special)* | can only be used only once within a DEL expression, and then it must appear to the right of a single variable name which begins the expression; it cannot be otherwise imbedded (e.g. as in the C language — DEL is instead more like Pascal in its treatment of assignment statements).

§ *The assignment operator is limited to usage only within the general calculation section of a scenario.*

Functions

The following functions are intrinsics within DEL.

Mathematical Functions

| Name | Meaning |
|---|---|
| exp(x) | e to the power x |
| ln(x) | natural log of x |
| sqrt(x) | square root of x |
| abs(x) | absolute value of x |
| pow(x,y) | x to the power y |
| norm(x) | normal density for x |
| cum(x) | cumulative normal distribution for x |
| trunc(x) | truncate x to integer towards zero |
| round(x) | round to nearest integer |
| max(x,y) | maximum of x and y |

Logical (Boolean) Functions

| Name | Meaning |
|---|---|
| if(x, y, z) | if x, then y otherwise z |
| true() | true |
| false() | false |

Statistical Functions

| Name | Meaning |
|---|---|
| inc(c,x) | accumulate value x to cumulator c |
| incsum(c) | value of summation of cumulator c |
| incavg(c) | value of average of cumulator c |
| incvar(c) | value of sample variance of cumulator c |
| incsumsq(c) | value of sum of squares of cumulator c |
| inccount(c) | value of sample size of cumulator c |

DEL provides a special data type called a cumulator for storing basic statistics regarding an observed variable. A cumulator is established at the beginning of a simulation. In the first and every subsequent invocation of inc(c,x), the observation x is "posted" to the cumulator c. The cumulator implements incremental statistics, and so is always available for accessing a statistic such as the average (incavg(c)) or the variance (incvar(c)) for that particular cumulator.

It is an error to try to use a retrieval function with a cumulator variable which hasn't had anything stored in it via the inc() function.

Cumulator references ("c" in the foregoing table) occur through a selector, which is an integer in the range 1–16. The cumulator itself simply keeps a triple of numbers: a count of observations, the observations' sum, and the sum of squares. For example, cumulator 1 begins in state [count, sum, sumsq] = [0, 0, 0]. Invocation of "inc(1,3)" would change this cumulator's state to [1,3,9]. Another invocation "inc(1,5)" will update the cumulator to [2, 8, 34]. At this point, a reference to "incavg(1)" would have value $4 = 8/2$; a reference to "incvar(1) would have value $1 = (34-8^2/2)/2$.

§ *Variance calculations (i.e. incvar()) in DEL assume a known mean. If you need a variance for an unknown mean, multiply the latter by inccount(c)/(inccount(c)-1).*

Date/Time Functions

| Name | Meaning |
|---|---|
| basedate() | starting time of simulation, defined as last date in price history |
| chgtime(time, amount, unit) | <time> increased by <amount> <unit>s |
| difftime(time1, time2, unit, round) | elapsed time between <time1> and <time2>, expressed in <unit>s, rounded if <round> is true(), otherwise truncated towards zero ??? |
| ctime(y,m,d [,hr,min]) | arithmetic to date/time conversion |
| unittime(time, unit) | unit corresponding to time ??? |
| minute() | unit minute |
| hour() | unit hour |
| day() | unit day |
| month() | unit month |
| year() | unit year |
| wkday() | day of the week ??? |
| yearday() | days in next year ??? |

There are some operations which are useful in dealing with dates and times which cannot readily be accomplished using simple arithmetic operators: figuring out what year a date is in, adding a month to a date, and so on. These are accomplished with several functions:

chgtime(time,amount,unit) - result is time Change time by whole units.

difftime(time1,time2,unit,round) - result is number Time elapsed between two times in given units (time2 - time1). round is TRUE for round-to-nearest and FALSE for truncate toward zero. (### Do we need more options than these, such as no rounding (e.g. leave fractional part), round to + infinity, round to - infinity, round away from zero?)

time(y,m,d,hr,min) - result is time Converts numbers to a time serial number. Most useful with variables; you can do this with constant numbers using the @ notation.

unittime(time,unit) - result is number Gives number of units corresponding to time.

As returned from unittime(), weekday values run 1 (Sunday) to 7 (Saturday), months run 1 (January) to 12 (December), and years are in the form 19XX or 20XX. Year days run 1-365, or 366 in leap years.

In the chgtime() and ctime() functions, the time units must be whole units in the range -32768 to 32767.

The allowable dates range from the years 1970 to 2037. Functions which create or change dates must wind up with values in this range.

Market Reference Functions

| Name | Meaning |
|---|---|
| xprice([row]) | price of underlying asset [at event <row> or current event if blank] |
| xhistprice([date]) | price of underlying asset [at historical <date> or basedate if blank] |
| xnumrate(date,[date2]) | numeraire interest rate on <date> [or average rate between <date> and <date2>] |
| xyield(date,[date2]) | asset yield on <date> [or average rate between <date> and <date2>] |
| xvol(date,[date2]) | asset volatility on <date> [or average volatility between <date> and <date2>] |

If called with one date, the functions will return the corresponding value, interpolating or extrapolating from the input values if necessary.

For functions callable with two dates, the functions will return the *average* value for the interval specified by the two dates, as calculated by integration using values in the table, and interpolating or extrapolating if necessary. The order of dates given does not affect the result. For instance, xyield(1/1/91, 1/1/92) and xyield(1/1/92, 1/1/91) give the same result.

Interpolation is done by linear interpolation. Extrapolation is done by assuming any time before the start of the table has the same value as the first table value, and any time after the end of the table has the same value as the last table value. Integration is done using the trapezoidal rule.

Event Reference Functions A DEL formula can reference the values of previously calculated field values within a scenario. Such references must be above or to the left of the field containing the reference. (Attempts to do a "forward reference" will cause an error.)

The functions used to obtain the values of scenario fields are time(), paycon(), and payval(), which reference the Time, Payoff Condition, and Payoff Value scenario fields respectively.

DEL formulas cannot reference fields in the General Calculation column, since the fields themselves have no value (although the variables set therein might). They also cannot reference the values of cells in the Absorption Condition column, since that is useless.

| Name | Meaning |
|---|---|
| time(row) | time at which event <row> occurred |
| paycon(row) | payoff contingency (boolean) for event <row> |
| payval(row) | payoff amount for event <row> |
| thisrow() | number of current event |

EXPRESSION PRECEDENCE ―――――

Precedence and Token Associativity Operator or Expression Class ――

9 Function calls Variable names Table value lookups Constant values
8 right Unary - UNARYOP Unary + ~ (logical not)
7 left * / MULOP 6 left + - ADDOP 5 left < > = ¯= <= >= COMPOP 4 left &

3 left |

2 , (function parameter separator)

1 := (assignment)

DATE AND TIME CALCULATIONS ───── lation Effective Result ───── ───── chgtime(@9/19/91, -1, day()) @9/18/91 difftime(@9/19/90, @9/19/91, year(), true()) 1 (one year) time(9,19,91,18,20) @9/19/90:18:20 unittime(@9/19/91, day()) 19

If a formula wants to get the date/time value corresponding to its row in the simulation, it may do so with the expression Time[this()]. For instance, difftime(starttime() ,Time[this()], month(), true()) will calculate the number of months since the date/time of the start of the simulation.

GENERAL REMARKS ─────

Names (variables and functions) are not case sensitive.

Variable names and function names exist in different name spaces, so you could have a variable named "if" and it wouldn't conflict with the if() function.

Blanks in the middle of expressions may be used for formatting, but are not significant in calculations. Blanks in the middle of variable or function names, however, are not allowed.

NOTES ─

1. These date/time formats are very USA-oriented and will undoubtedly cause complaints all over Europe and Asia. If there's a better format, let's use it, but let's pick one and stick with it world-wide. Otherwise, you wind up with a different program in every country and all kinds of file compatibility problems.

2. Although this isn't very pertinent to the language, date values are stored internally as 64-bit floats containing the target machine's "time_t"-type values. The allowable date values are those permitted by Unix, e.g. 1970 to 2037. Time values are also stored as 64-bit floats, and represent the number of seconds since midnight.

3. We use 64-bit floating point numbers because they're more portable than 80-bit. Actually, the DOS/Windows version uses a lot of 80-bit numbers internally.

5. For instance: You have a one-year option to buy pork belly contracts at $5,000, and three months into the contract, the price of pork belly contracts hits $6,000. Instead of waiting out the year, you "absorb" the option at this point and pocket the $1,000 profit.

Interest Rate and Volatility Inputs

In the financial markets, there are a wide variety of methods for quoting interest rates. DerivaTool adheres to a time-unit-independent standard, i.e. that of continuous-time, continuously-compounded interest rates, in part since it is quite difficult to misinterpret the meaning of these. In many applications, special pre-processing will have to be done to convert interest rates as quoted within a particular market to this standard form.

§ *One of the most basic interest rate conversions is between discount rates and continuous-time rates. If $r_d$ is the discount rate and $r_c$ is the continuous rate, equating the two compounding factors over tenor $T$ gives the expression $(1 + r_d T) = exp(r_c T)$, which means that the continuous rate can be derived from the discount rate via $ln(1 + r_d T)/T = r_c$. For interest rate conversion of instruments spanning more than one year, it is suggested that a competent textbook be consulted, as various complications frequently occur in some markets.*

Continuous-time interest rates are always employed by DerivaTool.

Case Sensitivity

Strings which are input to DerivaTool functions are not case-sensitive. (In addition, they are also not trimmed, and so you should not use more or fewer characters than required.)

Decimal Numbers

All numbers provided to DerivaTool are expressed as decimal quantities in their native units. If a year is chosen as the time unit (for interest rates, volatility, etc.), then a nine month period is expressed as "0.75." Similarly, an option trading at 30% volatility has an input parameter "0.30" (not 30), and an interest rate of 8% is expressed as "0.08" (not 8).

Output Interpretation

Theoretical Value

Theoretical value is the value predicted by modern financial theory as being the no-arbitrage "fair" pricing of the instrument, given the inputs provided. (This is of course subject to all of the assumptions which went into the model in deducing this "fair" price, which are basically random-walk, continuous-movement, perfect-markets price assumptions.) Obviously, markets may price the instruments at different values than the models predict, for a variety of reasons, one of which may be a mark-up or mark-down of the fair pricing by dealers making markets in those instruments.

Delta

Delta is a risk measure providing the net equivalent exposure in the underlying commodities of a financial instrument.

Gamma

Gamma is a risk measure corresponding to the rate of change of the absolute delta with respect to a price change. In principle, such a price change is considered to be infinitesimally small. If gammas over wider ranges are desired, two invocations of the model delta should be made and differenced, then divided by the price interval. In the domestic form of the model, the gamma is for a price change of the global commodity other than the accounting currency.

Theta

Theta is a risk measure corresponding to the time rate of change of the value of the instrument, over an infinitesimal interval of time. Some applications require "daily" thetas, which may approximated by dividing the theta by the number of days per year.

Index

A accounting currency .......... 4-13

C case sensitivity ............ 4-12

D delta ................ 2-6, 4-13
   absolute .............. 4-13

G gamma ............... 2-6, 4-13

I interest rate
   continuous-time ...... 4-12, 4-12
   continuously-compounded .... 4-12
   discount .............. 4-12
interest rate and volatility inputs .. 4-12

R rate conversions ........... 4-12

T theoretical value .......... 2-6, 4-13
theta ................ 2-6, 4-14
time decay ................ 2-6

What is claimed is:

1. A computer implemented system for constructing a simulation of an underlying asset and events effecting a value of the underlying asset and simulating a value for a derivative security based on the underlying asset, the system including a general purpose computer having a processor, a display device, an input device and a storage device for storing program instructions and data, said system comprising:

a user interface displayed on the input device and providing a data representation of a scenario for simulating the value of the derivative security, the data representation of the scenario including a data representation of at least one event, each data representation of an event simultaneously including a data representation of a simulation time at which the value of the derivative security or underlying asset may change and at least one data representation of an ordered plurality of expressions defining the event wherein any plurality of events represented in a scenario define an ordered series of simulation times at which the scenario is simulated;

a scenario input means operatively coupled to the processor and the input device for receiving from the user interface the data representation of the scenario, the scenario input means operatively coupled to the storage device for storing the data representation of the scenario therein such that each scenario is associated with its events and the expression contained therein;

a compiling means operatively coupled to the processor and the storage device for retrieving the data representation of a scenario and transforming any expression defining an event in the data representation into at least one executable code object, and for storing the code objects in the storage device;

a sequencing means for sequencing the code objects according to the ordered series of simulation times and the ordering within each event of the expressions from which the code objects were transformed to produce sequenced executable code objects, and for storing the sequenced code objects for independent retrieval and simulation, the sequencing means operatively coupled to the processor and the storage device for retrieving and storing the code objects; and a simulation means for executing the sequenced executable code objects with the processor to produce a simulated value for the derivative security, the simulation means operatively coupled to the processor, and the storage device for retrieving the sequenced executable code objects and storing the simulated value in the storage device.

2. The system of claim 1, wherein the data representation of each event further comprises:

a first data entry field for inputting for the event a time expression ordered, according to the display of the first data entry fields in defining a simulation time of the event, wherein for all events, the simulation times of the events are the user interface;

a second data entry field for inputting a general value expression defining conditions related to the value of the derivative security applying at the simulation time;

a third data entry field for inputting a payoff contingency expression defining whether the derivative security returns a value, a payoff value expression defining the value returned by the derivative security at the simulation time; and, a fourth data entry field for inputting an absorption contingency expression defining a condition for terminating execution of the sequence executable code objects.

3. A computer implemented method for constructing a simulation of an underlying asset and events effecting a value of the underlying asset and simulating a value for a derivative security based on the underlying asset, the method using a general purpose computer having a processor, a display device, an input device and a storage device for storing program instructions and data, the method comprising the steps of:

simultaneously displaying an ordered plurality of data entry fields for representing a plurality of events, the events ordered in the simulation according to the ordering of the data entry fields;

receiving user inputs defining a scenario for simulating the value of the derivative security by receiving for each event in the scenario:

a first user input in a first data entry field of the event specifying a simulation time of the event at which the value of the derivative security or underlying asset may change, wherein the simulation times of the events at which the scenario is simulated are ordered according to the pre-ordering of the first data entry fields;

a second user input in at least one other data entry field of the event specifying an ordered plurality of expressions defining the event at the simulation time of the event;

compiling with the processor any expression defining an event in the scenario into an executable code object, and storing the code objects in the storage device;

sequencing the code objects with the processor according to both the ordered series of simulation times and the ordering within each event of the expressions from which the code objects were compiled, to produce sequenced executable code objects, and storing the sequenced code objects in the storage device; and executing the sequenced executable code objects with the processor to produce a simulated value for the derivative security.

4. The method of claim 3, wherein receiving a second user input further comprises:

receiving a user input in a second data entry field defining at least one variable or equation for determining a value of the derivative security at the simulation time of the event or at the simulation times of subsequent events;

receiving a user input in a third data entry field defining a payoff contingency expression determining whether the derivative security returns a value at the simulation time of the event;

receiving a user input in a fourth data entry field a defining payoff value expression determining the value returned by the derivative security at the simulation time of the event; and receiving a user input in a fifth data entry field defining an absorption contingency expression for determining whether to terminate execution of the sequence executable code objects at the simulation time of the event.

5. The method of claim 4, wherein executing the sequenced executable code objects further comprises:

retrieving the sequenced code objects including at least one code object transformed from an absorption contingency expression; and executing the sequenced code objects for each event in the scenario in their sequenced order until the sequenced code object transformed from an absorption contingency expression requires termination of the execution of the sequenced code objects, wherein the simulated value of the derivative security is determined by a last executed code object transformed from a payoff value expression.

6. In a computer system including a processor, a display, and a memory, a graphical user interface for defining a simulation comprised of an ordered sequence of events, each event having a simulated time, the user interface comprising:

a plurality of ordered columns and ordered rows and forming a plurality of cells;

each row for representing an event at a simulated time, the simulated time of each row definable by the user, the simulated times of the rows and events ordered with the simulated time of one row after the simulated time of an immediately previous row, each row having a plurality of ordered cells, one cell for each of the ordered columns;

each row containing:
a time cell for storing a user input time expression defining the simulated time of the event for the row;
a number of other cells, each other cell for storing a user input expression defining at least one variable or at least one equation for the event at the simulated time of the row, the ordered cells in each row forming an ordered sequence of expressions in the row; and the plurality of ordered rows that include a user input time expression defining an ordered sequence of simulated times defined by a user for events in the simulation.

7. The user interface of claim 6, wherein:
at least one row represents a plurality of events, each event with a simulated time; and,
the user input time expression in the time cell of the at least one row defines a plurality of simulated times.

8. The user interface of claim 6, wherein the simulation is of a value for a derivative security based on at least one underlying asset, and the events in the simulation effect a value of the at least one underlying asset, wherein each row comprises:
a first cell for storing a general value expression defining variables and equations related to the value of the derivative security at the simulated time of the row;
a second cell for storing a payoff contingency expression defining whether the derivative security returns a value at the simulated time for the row;
a third cell for storing a payoff value expression defining the value returned by the derivative security at the simulated time of the row; and
a fourth cell for storing an absorption contingency expression defining whether simulation of the derivative security is terminated at the simulated time of the row.

9. The user interface of claim 8, further comprising:
a user input means for receiving market data for a user input date, including:
an interest rate for the date;
an asset term structure for at least one underlying asset;
a volatility term for at least one underlying asset;
a user input means for receiving price history data including a user input date and a user input asset price for the date; and a user input means for receiving a user input specifying a number of simulation iterations.

10. The user interface of claim 9, wherein the asset term structure is defined as one of a group comprising:
a asset forward price; and
an asset yield.

11. An apparatus, in a computer system including a processor, a display, and a memory, for defining a simulation comprised of an ordered sequence of events, each event having a simulated time, the apparatus comprising:

a graphical user interface having a plurality of ordered columns and ordered rows and forming a plurality of cells;

each row for representing an event at a simulated time, the simulated time of each row definable by the user, the simulated times of the rows and events ordered with the simulated time of one row after the simulated time of an immediately previous row, each row having a plurality of ordered cells, one cell for each of the ordered columns;

each row containing:
a time cell for storing a user input time expression defining the simulated time of the event for the row;
a number of other cells, each other cell for storing a user input expression defining at least one variable or at least one equation for the event at the simulated time of the row, the ordered cells in each row forming an ordered sequence of expressions in the row;

the plurality of ordered rows that include a user input time expression defining an ordered sequence of simulated times defined by a user for events in the simulation;

a compiler, executable by the processor, to receive from the user interface the expressions in the cells and to transform each expression into at least one code object, and for storing the code objects in the memory;

a sequencer, executable by the processor, to sequence the code objects according to both the ordered sequence of simulated times for the ordered rows, and the ordered sequence of expressions in each row from which the code objects were transformed, to produce sequenced code objects; and a simulation engine, executable by the processor, to execute the sequenced code objects with the processor to produce a value for the simulation.

12. A computer implemented method for defining a simulation comprised of an ordered sequence of events, each event simulated at a time, comprising:

displaying a screen display comprising a plurality of ordered rows and ordered columns, forming a plurality of cells, each row for representing an event and having a plurality of ordered cells, one cell for each of the ordered columns, receiving, as user inputs into the cells of at least one row, expressions defining an event by:
receiving into a time cell a user input time expression defining a simulated time of the event for the row;
for each of a number of other cells in the row, receiving a user input expression defining at least one variable or at least one equation for the event at the simulated time of the row, the ordered cells in each row forming an ordered sequence of expressions in the row; the plurality of ordered rows that include a user input time expression defining an ordered sequence of simulated times defined by a user for events in the simulation.

13. The computer implemented method of claim 12, wherein the simulation is of a value for derivative security based on at least one underlying asset, and the events in the simulation effect a value of the at least one underlying asset, further comprising for at least one row:

receiving into a first cell a general value expression defining variables and equations related to the value of the derivative security at the simulated time of the row;

receiving into a second cell a payoff contingency expression defining whether the derivative security returns a value at the simulated time for the row;

receiving into a third cell a payoff value expression defining the value returned by the derivative security at the simulated time of the row; and receiving into a fourth cell an absorption contingency expression defining whether simulation of the derivative security is terminated at the simulated time of the row.

14. A computer implemented method for determining a value of the simulation comprised of an ordered sequence of events, each event simulated at a time, the method comprising:

displaying a screen display comprising a plurality of ordered rows and ordered columns, forming a plurality of cells, each row for representing an event and having a plurality of ordered cells, one cell for each of the ordered columns, receiving, as user inputs into the cells of at least one row, expressions defining an event by:
      receiving into a time cell a user input time expression defining a simulated time of the event for the row;
      for each of a number cells in the row, receiving a user input expression defining at least one variable or at least one equation for the event at the simulated time of the row, the ordered cells in each row forming an ordered sequence of expressions in the row; the plurality of ordered rows that include a user input time expression defining an ordered sequence of simulated times defined by a user for events in the simulation;

compiling the expressions in the cells to transform each expression into at least one code object;

sequencing the code objects according to both the ordered sequence of simulated times for the ordered rows, and the ordered sequence of expressions each row from which the code objects were transformed, to produce sequenced code objects; and, executing the sequenced code objects to produce a value for the simulation.

15. A graphical user interface for defining a simulation, comprised of an ordered sequence of events, each event simulated at a time, of a value of the derivative security based on at least one underlying asset, the user interface comprising:

a plurality of ordered columns and ordered rows and forming a plurality of cells;

each row representing an event and having a plurality of ordered cells, one cell for each of the ordered columns;

a cell in each row for storing a user input time expression defining a simulated time of the event for the row at which the value of the derivative security or at least one underlying asset may change, the plurality of ordered rows defining an ordered sequence of simulated times for events; and, each other cell in each row storing an expression defining the event at the simulated time of the row, the expressions ordered according to the ordered cells in the row.

* * * * *